(12) United States Patent
Spillane et al.

(10) Patent No.: US 7,570,849 B2
(45) Date of Patent: Aug. 4, 2009

(54) INTEGRATED CIRCUIT DEVICE HAVING OPTICALLY COUPLED LAYERS

(75) Inventors: Sean M. Spillane, Mountain View, CA (US); Raymond G. Beausoleil, Redmond, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 452 days.

(21) Appl. No.: 11/158,666

(22) Filed: Jun. 21, 2005

(65) Prior Publication Data

US 2006/0285792 A1 Dec. 21, 2006

(51) Int. Cl.
*G02B 6/26* (2006.01)
(52) U.S. Cl. ............................. 385/30; 385/9
(58) Field of Classification Search ................ 385/14, 385/27, 30, 50, 129, 131
See application file for complete search history.

(56) References Cited

U.S. PATENT DOCUMENTS

| | | | | |
|---|---|---|---|---|
| 4,750,799 A | * | 6/1988 | Kawachi et al. | 385/14 |
| 5,009,476 A | * | 4/1991 | Reid et al. | 385/14 |
| 5,148,504 A | * | 9/1992 | Levi et al. | 385/14 |
| 5,500,540 A | * | 3/1996 | Jewell et al. | 257/82 |
| 5,568,574 A | * | 10/1996 | Tanguay et al. | 385/14 |
| 5,581,646 A | * | 12/1996 | Tsukamoto et al. | 385/96 |
| 5,757,989 A | * | 5/1998 | Yoshimura et al. | 385/14 |
| 5,761,350 A | * | 6/1998 | Koh | 385/14 |
| 5,999,308 A | * | 12/1999 | Nelson et al. | 359/321 |
| 6,091,879 A | * | 7/2000 | Chan et al. | 385/143 |
| 6,343,171 B1 | * | 1/2002 | Yoshimura et al. | 385/50 |
| 6,618,535 B1 | * | 9/2003 | Reynolds | 385/129 |
| 6,690,845 B1 | * | 2/2004 | Yoshimura et al. | 385/14 |
| 6,785,447 B2 | * | 8/2004 | Yoshimura et al. | 385/42 |
| 6,832,033 B2 | * | 12/2004 | Prather et al. | 385/129 |
| 6,845,184 B1 | * | 1/2005 | Yoshimura et al. | 385/14 |
| 6,853,479 B1 | * | 2/2005 | Ilchenko et al. | 359/337.5 |
| 6,895,136 B2 | * | 5/2005 | Deliwala | 385/14 |
| 7,139,448 B2 | * | 11/2006 | Jain et al. | 385/14 |
| 7,194,174 B2 | * | 3/2007 | Dridi et al. | 385/129 |
| 2002/0004307 A1 | * | 1/2002 | Yamada | 438/691 |
| 2002/0028045 A1 | * | 3/2002 | Yoshimura et al. | 385/50 |
| 2004/0258383 A1 | * | 12/2004 | Sato et al. | 385/129 |

(Continued)

FOREIGN PATENT DOCUMENTS

EP 1136853 9/2001

(Continued)

OTHER PUBLICATIONS

Asano et al. "Investigation of a channel-add/drop-filtering device using acceptor-type point defects in a two-dimensional photonic crystal slab." Applied Physics Letters. vol. 83, No. 3. Jul. 21, 2003. pp. 407-409.*

(Continued)

*Primary Examiner*—James P Hughes
*Assistant Examiner*—Peter Radkowski

(57) ABSTRACT

In an integrated circuit device comprising a vertical arrangement of integrated circuit layers, coupling of an optical signal between a first integrated circuit layer thereof and a second integrated circuit layer thereof is described. The optical signal is evanescently coupled between a photonic crystal defect waveguide and a photonic crystal defect cavity in the first integrated circuit layer and projectably coupled between the photonic crystal defect cavity and an optical aperture on the second integrated circuit layer.

22 Claims, 3 Drawing Sheets

U.S. PATENT DOCUMENTS

2005/0078902 A1* 4/2005 Beausoleil et al. ............. 385/1
2005/0094942 A1* 5/2005 Feuer et al. ................... 385/50

FOREIGN PATENT DOCUMENTS

WO    WO2005/038514 A2    4/2005

OTHER PUBLICATIONS

Asano et al. "Investigation of a channel-add/drop-filtering device using acceptor-type point defects in a two-dimensional photonic-crystal slab." Applied Physics Letters. V. 83, N. 3. pp. 407-409.*

Asano, T., et. al., "Investigation of a channel-add/drop-filtering device . . . in a two-dimensional photonic-crystal slab." App. Phys. Lett. vol. 83, No. 3. 407-9 (Jul. 21, 2003).

* cited by examiner

INTEGRATED CIRCUIT DEVICE HAVING OPTICALLY COUPLED LAYERS

FIELD

This patent specification relates to coupling signals between different layers of an integrated circuit device.

BACKGROUND

Integrated circuit devices have become essential components in a wide variety of products ranging from computers and robotic devices to household appliances and automobile control systems. New applications continue to be found as integrated circuit devices become increasingly capable and fast while continuing to shrink in physical size and power consumption. As more integrated circuit chips performing at least one electrical and/or optical function, and includes both single-chip and multi-chip devices. In multi-chip devices, each integrated circuit chip is usually separately fabricated or "built up" from a substrate, and the resultant chips are bonded together or otherwise coupled into a common physical arrangement.

Advances in integrated circuit technology continue toward reducing the size of electrical circuits to smaller and smaller sizes, such that an entire local electrical circuit (e.g., a group of memory cells, a shift register, an adder, etc.) can be reduced to the order of hundreds of nanometers in linear dimension, and eventually even to tens of nanometers or less. At these physical scales and in view of ever-increasing clock rates, limitations arise in the data rates achievable between different parts of the integrated circuit device, with local electrical circuits having difficulty communicating with "distant" electrical circuits over electrical interconnection lines that may be only a few hundred or a few thousand microns long.

To address these issues, proposals have been made for optically interconnecting different electrical circuits in an integrated circuit device. For example, in the commonly assigned U.S. 2005/0078902A1, a photonic interconnect system is described that avoids high capacitance electric interconnects by using optical signals to communicate data between devices.

As part of such optical interconnection schemes, optical coupling between planar waveguides located on different integrated circuit layers is often needed. In a simplest proposal applicable to inter-chip coupling, two chips are mounted side-by-side such that an edge facet of a first waveguide on the first chip directly abuts an edge facet of a second waveguide on the second chip. In another proposal, an optical fiber is used to transfer optical signals between the two edge facets of the different chips. In yet another proposal, an optical fiber is used to couple between a surface-emitting source on the first chip and a detector on the second chip, each chip having electrical-to-optical (E-O) and optical-to-electrical (O-E) converter(s) as necessary. However, issues arise for such proposals that limit their operational scalability (e.g., the number of optical interconnections achievable between chips) and/or the amount of achievable device compactness.

Vertical optical coupling schemes have also been proposed in which optical signals are transferred between facing layers of vertically arranged chips, the vertical arrangement providing for a smaller footprint while also accommodating a larger number of optical interconnections between the facing chips. Proposals include the use of angled reflecting structures and/or grating structures for urging vertical projection through an aperture on one layer and corresponding vertical collection into an aperture on the other layer.

Issues arise, however, in relation to one or more of optical coupling efficiency and optical crosstalk between different aperture pairs, especially as the vertical spacing between the facing layers is increased. Other issues arise in relation to one or more of electrical crosstalk among facing electrical elements, lateral area requirements of the vertical optical coupling subsystems, accommodation of vertical surface features on the facing surfaces, device complexity, alignment issues, and fabrication cost. Still other issues arise as would be apparent to one skilled in the art upon reading the present disclosure. It would be desired to provide for optical coupling between different layers of an integrated circuit device, whether such layers be all-optical or electro-optical, in a manner that addresses one or more of these issues.

SUMMARY

In one embodiment, in an integrated circuit device comprising a vertical arrangement of integrated circuit layers, a method for coupling an optical signal between a first integrated circuit layer thereof and a second integrated circuit layer thereof is provided. The optical signal is evanescently coupled between a photonic crystal defect waveguide and a photonic crystal defect cavity in the first integrated circuit layer and projectably coupled between the photonic crystal defect cavity and an optical aperture on the second integrated circuit layer.

Also provided is an integrated circuit device, comprising a first integrated circuit layer having an optical aperture and a second integrated circuit layer having a photonic crystal defect waveguide and a photonic crystal defect cavity. An optical signal propagating along the photonic crystal defect waveguide is evanescently coupled between the photonic crystal defect waveguide and the photonic crystal defect cavity and projectably coupled between the photonic crystal defect cavity and the optical aperture.

Also provided is an apparatus, comprising a first integrated circuit layer having an optical aperture and a second integrated circuit layer having a photonic crystal defect waveguide and a photonic crystal defect cavity. The apparatus further comprises means for evanescently coupling an optical signal propagating along the photonic crystal defect waveguide between the photonic crystal defect waveguide and the photonic crystal defect cavity, and means for projectably coupling the optical signal between the photonic crystal defect cavity and the optical aperture.

DETAILED DESCRIPTION

Figure 1:
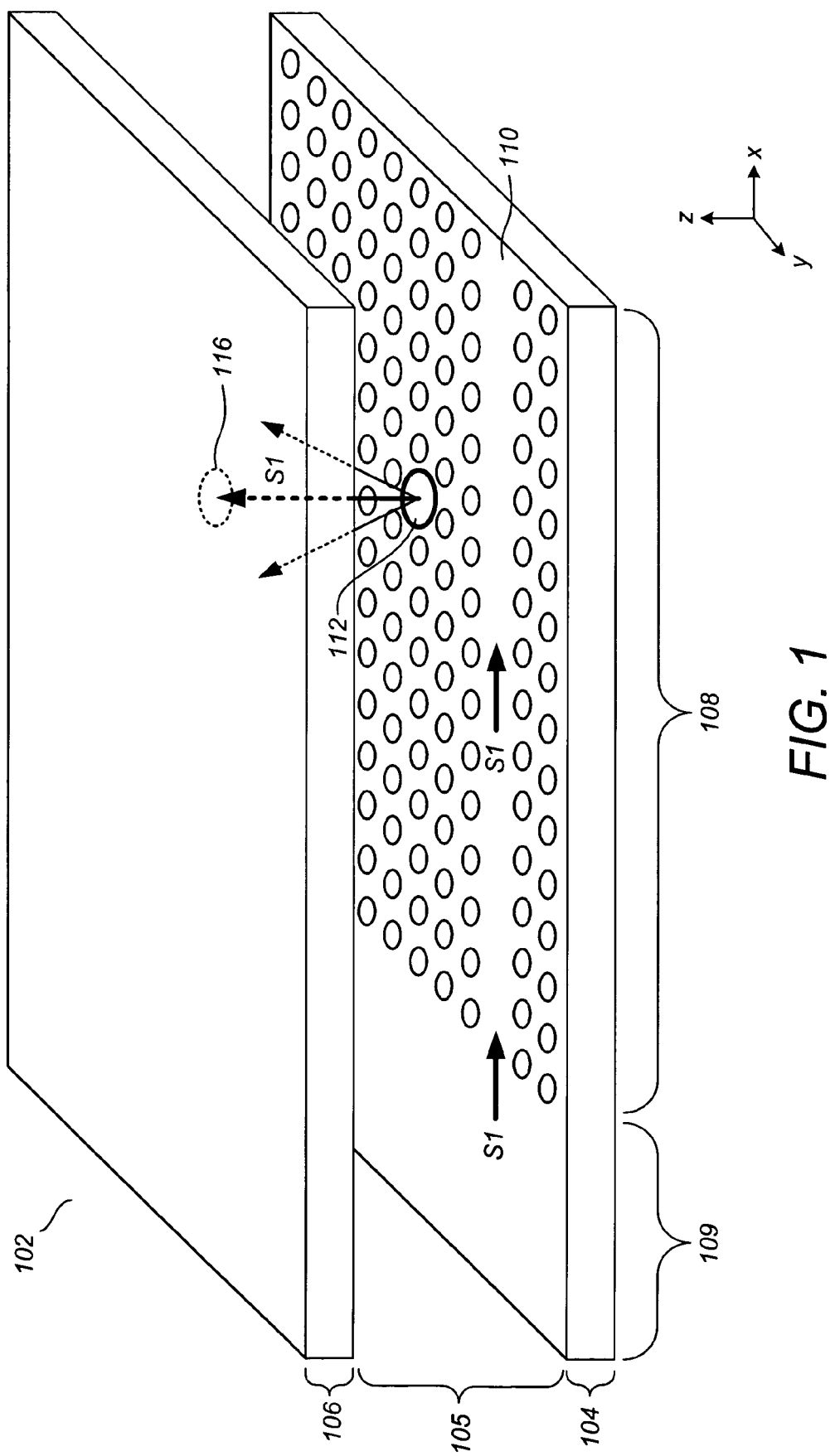
FIG. 1 illustrates a perspective view of an integrated circuit device according to an embodiment.

FIG. 1 illustrates a perspective view of an integrated circuit device 102 according to an embodiment, comprising an upper layer 106 and a lower layer 104 separated by an intervening layer 105, a height of the intervening layer 105 being exaggerated for clarity of presentation. The layers 104 and 106 may be from two different integrated circuit chips that have been glued together, bonded together, or otherwise assembled into a vertical arrangement. Alternatively, the layers 104 and 106 may in a common integrated circuit chip. As used herein, a layer of an integrated circuit device refers to a vertically contiguous slab-like subvolume of the integrated circuit device. It is to be appreciated that a layer may itself comprise a plurality of material sub-layers having relatively complex structures and functionalities. Thus, for example, the layers 104 and 106 may each comprise several adjacent sub-layers of differing materials formed, processed, patterned, or otherwise fabricated to achieve various electrical, electrooptical, and/or optical functionalities.

The layers 104 and 106 may both be all-optical or may both be electrooptical. Alternatively, one of the layers 104 and 106 may be all-optical and the other may be electrooptical. In one embodiment, the upper layer 106 may comprise densely-packed arrays of electrical circuits, each being laterally adjacent to a nearby optical communications port having O-E and E-O conversion elements, while the lower layer 104 may comprise an "optical LAN" facilitating information transfer of information among "distant" electrical circuits on the upper layer 106. In another embodiment, the layers 104 and 106 may be used for facilitating the photonic interconnect system described in the commonly assigned U.S. 2005/0078902A1, supra.

Integrated circuit device 102 further comprises a photonic crystal structure 108 formed within the lower layer 104. Photonic crystal structure 108 comprises an artificially engineered periodic dielectric array having at least one photonic bandgap, i.e., a range of frequencies in which ordinary electromagnetic wave propagation is strictly forbidden. The presence of these photonic bandgaps can be used to confine and guide electromagnetic waves along paths of missing or differently-shaped elements of the periodic array, termed defect waveguides herein, for frequencies within the at least one photonic bandgap, those frequencies being permitted to exist along the defect waveguides but not being permitted to exist in the non-defect areas. One such defect waveguide is indicated as element 110 in FIG. 1 and that guides an optical signal S1 having a frequency within the at least one photonic bandgap. As indicated in FIG. 1, the optical signal S1 is received from an outlying section 109 of the lower layer 104 representing any of a broad variety of electrooptical or all-optical circuits that may, or may not, comprise photonic crystal structures.

According to an embodiment, a photonic crystal defect cavity 112 is formed within the photonic crystal structure 108. The defect cavity 112 is configured and positioned to be evanescently coupled with the defect waveguide 110 at a frequency of the optical signal S1 and to radiate light vertically out of the plane of the lower layer 104 at that frequency. Such evanescent coupling can be achieved where an evanescent field of a resonant mode of the defect cavity 112 overlaps with an evanescent field of the optical signal S1 traveling in the defect waveguide 110 and is phase-matched therewith.

The defect cavity 112 is projectably coupled with an optical aperture 116 contained on the upper layer 106. As used herein, projectably coupled refers broadly to any of a variety of scenarios in which light is radiated from a first aperture and collected at a second aperture. Usually, the first and second apertures are separated by some non-zero distance, although the scope of the present teachings includes scenarios in which the first and second apertures are in direct contact. Projectable coupling includes, but is not limited to, free-space radiation across air or a homogeneous material volume, as well as projection through a lensing element that images, or partially images, the first aperture onto the second aperture (and vice versa).

Generally speaking, light radiates out of the defect cavity 112 in a cone-shaped pattern at an angle that is dependent on the particular geometries and materials of the defect cavity 112 and the refractive index of the intervening layer 105. For embodiments in which lensing elements are not used, it is preferable to keep the separation between the layers 104 and 106 less than a lateral dimension of the defect cavity 112 to achieve a reasonable degree of coupling, although the scope of the present teachings is not so limited.

The optical aperture 116 broadly represents any kind of optical element capable of collecting and/or transmitting light. Examples include optical emitters, optical detectors, lenses, waveguide facets, etc. In one embodiment, the upper layer 106 comprises a mirror configuration of the lower layer 104 including a second photonic crystal defect cavity and a second photonic crystal defect waveguide, the optical aperture 116 corresponding to a downward-facing surface of the second photonic crystal defect cavity.

The defect cavity 112 and defect waveguide 110 can also be configured such that a downward-projected optical signal is collected by the defect cavity 112 and evanescently coupled into the defect waveguide 110. In one embodiment, the defect cavity 112 and defect waveguide 110 are configured to accommodate bidirectional vertical coupling out of and into the lower layer 104. In another embodiment, the defect cavity 112 and defect waveguide 110 are optimized for one-way vertical coupling out of the lower layer 104, usually at the expense of coupling efficiency in the other direction into the lower layer 104. In another embodiment, the defect cavity 112 and defect waveguide 110 are optimized for one-way vertical coupling into the lower layer 104, usually at the expense of coupling efficiency in the other direction out of the lower layer 104.

Particular parameters for achieving the above-described evanescent coupling and vertical projection/collection will be highly dependent on the particular wavelengths, refractive indices, loss coefficients, polarizations, coupling geometries, and physical dimensions used. In view of the present disclosure, one skilled in the art would be readily able to mathematically and/or empirically determine suitable combinations of such parameters providing sufficient vertical optical coupling. By way of example only and not by way of limitation, in one configuration suitable for a typical optical communications wavelength of 1550 nm, the photonic crystal structure 108 may comprise a 250 nm-thick Si slab with a triangular lattice pattern of 120-nm-wide cylindrical air holes having a lattice constant of 420 nm. The defect waveguide 110 may be formed by a single missing line of air holes, and the defect cavity 112 may be formed by an enlarged air hole point defect with a diameter of 445 nm having a center 1090 nm away (i.e., three rows away) from a center of the defect waveguide 110.

However, a wide variety of other materials and device parameters for the photonic crystal structure 108 can be used for accommodating a wide range of optical wavelengths. Suitable slab materials for the photonic crystal structure 108 include, but are not limited to, relatively high-index materials such as Si (n=3.42), InP (n=3.1), GaAs (n=3.3), and SiN/$Si_3N_4$ (n=2.2). More generally, suitable photonic crystal slab materials include, but are not limited to, Group IV materials (e.g., Si, Ge, SiC), Group III-V materials (e.g., GaN, GaP, InP, InAs, AlN), and Group II-VI materials (e.g., ZnO, CdS).

Suitable hole materials for the photonic crystal structure 108 include, but are not limited to air, various low-index liquids or gels, and various other low-index materials such as $SiO_2$ (n=1.44), poly-dimethyl siloxane (PDMS, n=1.4), and polymethyl methacrylate (PMMA, n=1.49). The intervening layer 105 may comprise air or another low-index material.

Figure 2:
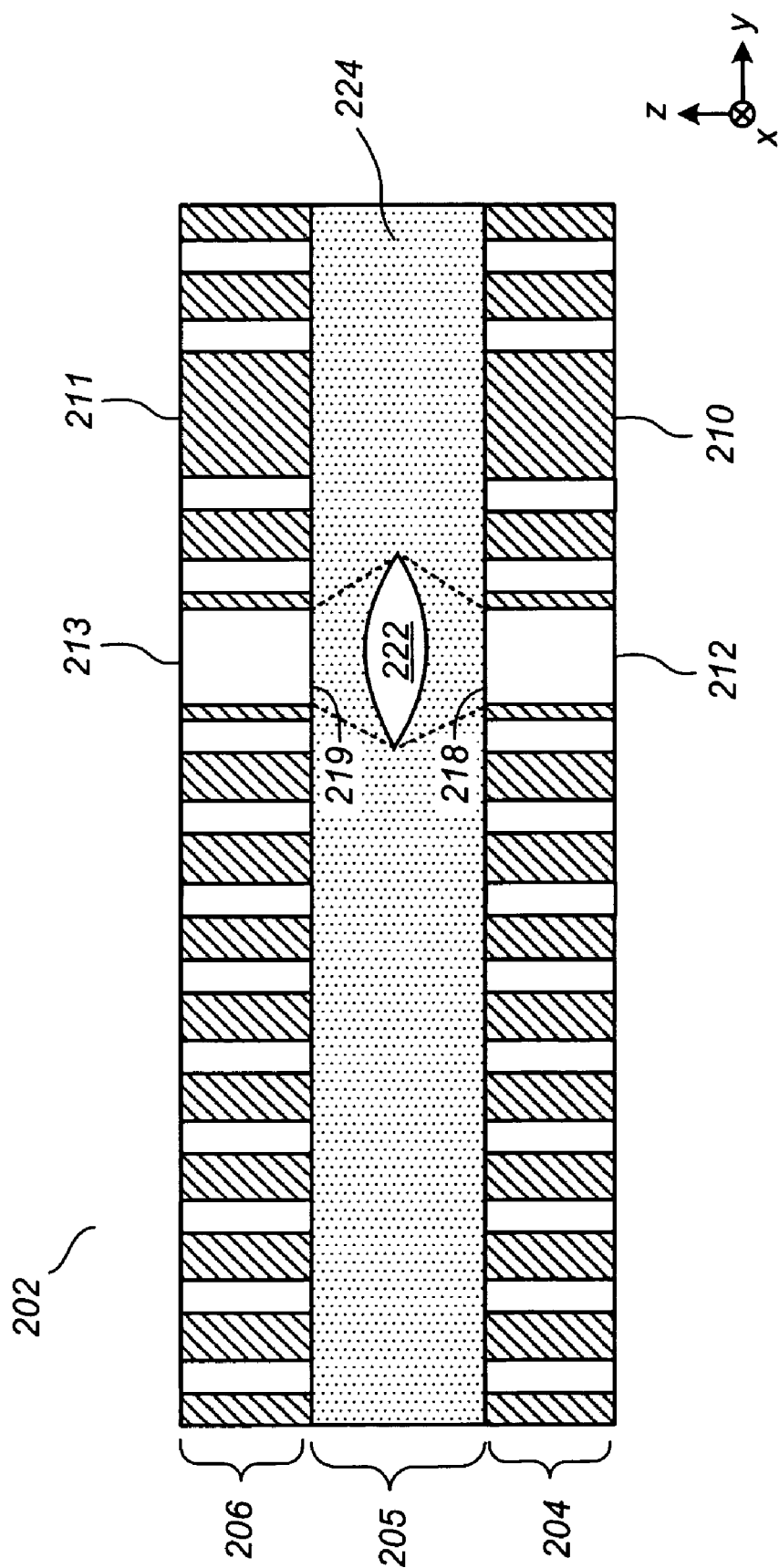
FIG. 2 illustrates a side cut-away view of an integrated circuit device according to an embodiment.

FIG. 2 illustrates a side cut-away view of an integrated circuit device 202 according to an embodiment, comprising a lower layer 204 having a photonic crystal structure into which is formed a defect waveguide 210 (passing into and out of the page) evanescently coupled with a defect cavity 212, the defect cavity 212 projectably emitting light (and/or collecting light) at an optical aperture 218. Integrated circuit device 202 further comprises an upper layer 206 substantially mirroring the lower layer 204, having a photonic crystal structure into which is formed a defect waveguide 211 (also passing into and out of the page) evanescently coupled with a defect cavity 213, the defect cavity 213 collecting light (and/or projectably emitting light) at an optical aperture 219.

In accordance with an embodiment, a lensing element 222 is positioned in an intervening layer 205 between the lower layer 204 and the upper layer 206, the lensing element 222 being configured and positioned to image the optical apertures 218 and 219 onto each other for increasing optical coupling efficiency and allowing for increased separation between the lower layer 204 and the upper layer 206. The position of the lensing element 222 can be maintained by a low-index solid material 224 in the intervening layer 205, or by using any of a variety of other positioning/mounting techniques.

Figure 3:
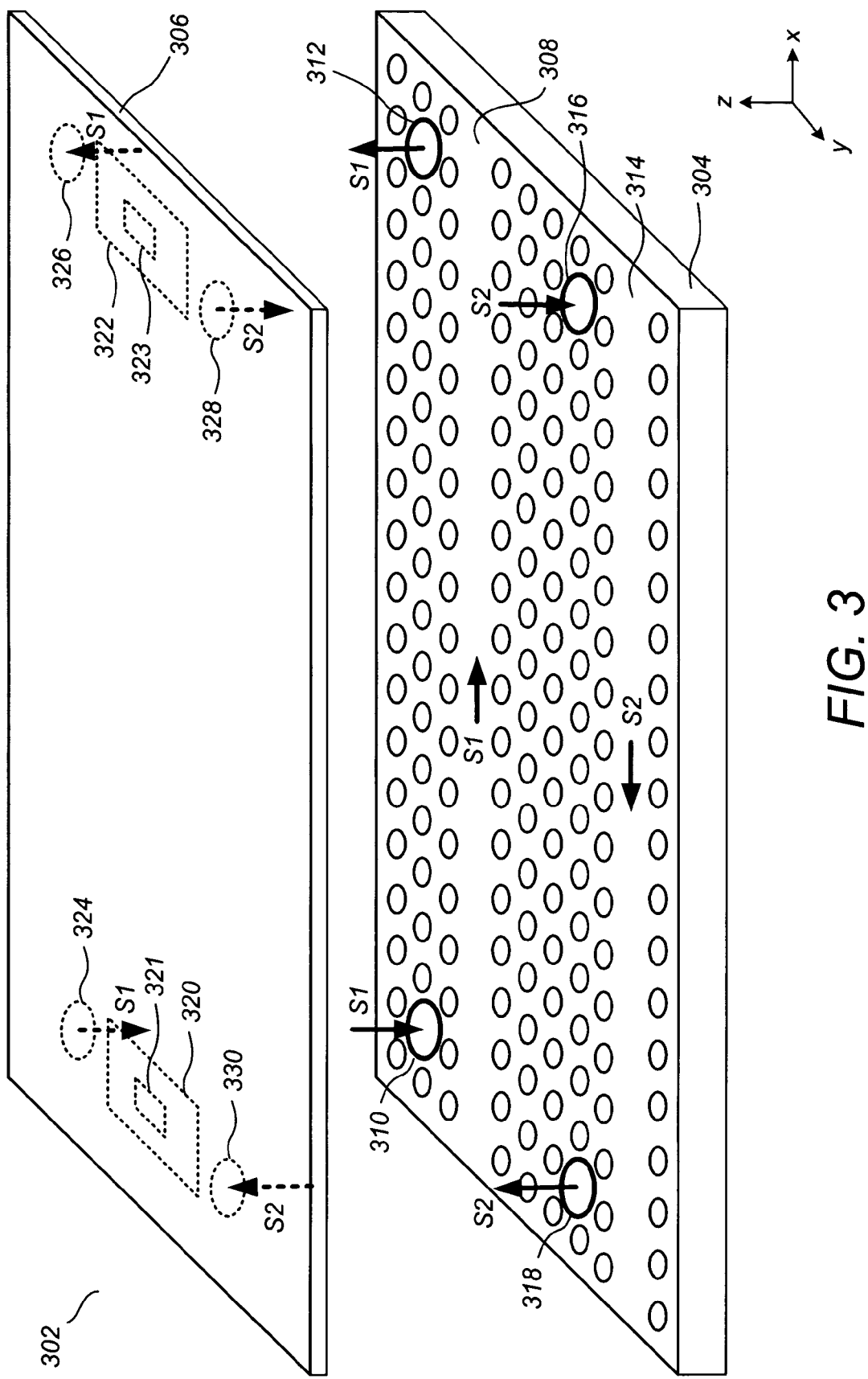
FIG. 3 illustrates a perspective view of an integrated circuit device according to an embodiment.

FIG. 3 illustrates a perspective view of an integrated circuit device 302 according to an embodiment, comprising a lower layer 304 and an upper layer 306, the vertical separation between them in FIG. 3 being greatly exaggerated for clarity of presentation. Lower layer 304 comprises a photonic crystal structure into which is formed a first defect waveguide 308 evanescently coupled with each of a first defect cavity 310 and a second defect cavity 312. Also formed into the photonic crystal structure is a second defect waveguide 314 evanescently coupled with each of a third defect cavity 316 and a fourth defect cavity 318. Upper layer 306 comprises first and second electrooptical circuits 320 and 322, which may each comprise highly dense electrical circuits 321 and 323 and which may be very "distant" from each other from an electrical signal propagation perspective. Upper layer 306 further comprises first, second, third, and fourth optical apertures 324, 326, 328, and 330 as shown in FIG. 3, wherein the first and second optical apertures 324 and 326 may be an optical emitter/optical receiver pair for one direction of communication between the dense electrical circuits 321 and 323, and wherein the third and fourth optical apertures 328 and 330 may be an optical emitter/optical receiver pair for the other direction.

In operation, a first optical signal S1 is projectably coupled from the first optical aperture 324 into the first defect cavity 310, evanescently coupled from the first defect cavity 310 into the first defect waveguide 308, propagated along the first defect waveguide 308 and evanescently coupled into the second defect cavity 312, and projectably coupled from the second defect cavity 312 into the second optical aperture 326. For the other direction, a second optical signal S2 is projectably coupled from the third optical aperture 328 into the third defect cavity 316, evanescently coupled from the third defect cavity 316 into the second defect waveguide 314, propagated along the second defect waveguide 314 and evanescently coupled into the fourth defect cavity 318, and projectably coupled from the fourth defect cavity 318 into the fourth optical aperture 330.

Fabrication of integrated circuit devices according to one or more of the embodiments can be achieved using known integrated circuit fabrication methods including, but not limited to: deposition methods such as chemical vapor deposition (CVD), metal-organic CVD (MOCVD), plasma enhanced CVD (PECVD), chemical solution deposition (CSD), sol-gel based CSD, metal-organic decomposition (MOD), Langmuir-Blodgett (LB) techniques, thermal evaporation/molecular beam epitaxy (MBE), sputtering (DC, magnetron, RF), and pulsed laser deposition (PLD); lithographic methods such as optical lithography, extreme ultraviolet (EUV) lithography, x-ray lithography, electron beam lithography, focused ion beam (FIB) lithography, and nanoimprint lithography; removal methods such as wet etching (isotropic, anisotropic), dry etching, reactive ion etching (RIE), ion beam etching (IBE), reactive IBE (RIBE), chemical-assisted IBE (CAIBE), and chemical-mechanical polishing (CMP); modifying methods such as radiative treatment, thermal annealing, ion beam treatment, and mechanical modification; and assembly methods such as wafer bonding, surface mount, and other wiring and bonding methods.

Whereas many alterations and modifications of the embodiments will no doubt become apparent to a person of ordinary skill in the art after having read the foregoing description, it is to be understood that the particular embodiments shown and described by way of illustration are in no way intended to be considered limiting. By way of example, resonance conditions associated with the photonic crystal defect cavities can be manipulated to implement various optical filtering or multiplexing/demultiplexing schemes for wavelength-division multiplexed (WDM) optical signals.

By way of further example, while in one or more of the above embodiments the photonic crystal structures comprise optically passive materials, in other embodiments active materials may be used that, responsive to one or more electrical and/or optical control signals, serve to modulate, amplify, filter, multiplex/demultiplex, or otherwise control lateral propagation properties and/or vertical coupling properties. By way of still further example, although the present teachings are particularly advantageous in the context of ever-shrinking hybrid optoelectronic devices, they are readily applicable to all-optical integrated circuit devices (e.g., as used in all-optical computing devices), as well as to larger-sized devices.

By way of even further example, although one or more of the embodiments is particularly useful for obviating the need for optical fiber connections between chips, optical fibers may still be used for various other purposes in the integrated circuit device (e.g., importing higher-power optical carrier signals from off-chip lasers) without departing from the scope of the present teachings. By way of still further example, although one or more of the embodiments is particularly useful where the layers are each contained on integrated circuit chips, the scope of the present teachings includes scenarios where one layer is on an integrated circuit chip, and the other layer is on a printed-circuit board or other type of back-plane/packaging assembly. Thus, reference to the details of the described embodiments are not intended to limit their scope.

What is claimed is:

1. In an integrated circuit device comprising a vertical arrangement of integrated circuit layers, a method for coupling an optical signal between a first integrated circuit layer thereof and a second integrated circuit layer thereof, comprising:

evanescently coupling the optical signal between a photonic crystal defect waveguide and a photonic crystal defect cavity in the first integrated circuit layer; and projectably coupling the optical signal through a lensing element disposed between said photonic crystal defect cavity and an optical aperture on the second integrated circuit layer.

2. The method of claim 1, wherein the optical signal is evanescently coupled from said photonic crystal defect waveguide into said photonic crystal defect cavity and projected out of said photonic crystal defect cavity into said optical aperture.

3. The method of claim 1, wherein the optical signal is projected out of said optical aperture and into said photonic crystal defect cavity and evanescently coupled from said photonic crystal defect cavity into said photonic crystal defect waveguide.

4. The method of claim 1, wherein the optical signal is projected through a lensing element positioned within an intervening layer positioned between said first integrated circuit layer and said second integrated circuit layer, said lensing element being configured and positioned to image said photonic crystal defect cavity and said optical aperture onto each other.

5. The method of claim 1, said photonic crystal defect waveguide being a first photonic crystal defect waveguide, said photonic crystal defect cavity being a first photonic crystal defect cavity, and said optical aperture corresponding to a second photonic crystal defect cavity in the second integrated circuit layer, further comprising evanescently coupling the optical signal to a second photonic crystal defect waveguide in the second integrated circuit layer.

6. The method of claim 1, said optical aperture being a first optical aperture and said photonic crystal defect cavity being a first photonic crystal defect cavity, further comprising:
propagating the optical signal along said photonic crystal defect waveguide between a first location near said first photonic crystal defect cavity and a second location near a second photonic crystal defect cavity in the first integrated circuit layer;
evanescently coupling the optical signal between said photonic crystal defect waveguide and said second photonic crystal defect cavity; and
projectably coupling the optical signal between said second photonic crystal defect cavity and a second optical aperture on the second integrated circuit layer.

7. The method of claim 6, said photonic crystal defect waveguide being a first photonic crystal defect waveguide, said optical signal being a first optical signal projected out of said first optical aperture into said first photonic crystal defect cavity, evanescently coupled from said first photonic crystal defect cavity into said first photonic crystal defect waveguide, propagated along said first photonic crystal defect waveguide from said first location to said second location, evanescently coupled from said first photonic crystal defect waveguide into said second photonic crystal defect cavity, and projected out of said second photonic crystal defect cavity into said second optical aperture, the method further comprising:
projecting a second optical signal out of a third optical aperture in said second integrated circuit layer into a third photonic crystal defect cavity in said first integrated circuit layer;
evanescently coupling the second optical signal from said third photonic crystal defect cavity into a second photonic crystal defect waveguide;
propagating the second optical signal along said second photonic crystal defect waveguide from a third location near the third photonic crystal defect cavity to a fourth location near a fourth photonic crystal defect cavity in said first integrated circuit layer;
evanescently coupling the second optical signal from said third photonic crystal defect waveguide into said fourth photonic crystal defect cavity; and
projecting the second optical signal out of said fourth photonic crystal defect cavity into a fourth optical aperture in said second integrated circuit layer.

8. The method of claim 1, wherein said first and second integrated circuit layers are separated by a distance less than a lateral dimension of said photonic crystal defect cavity.

9. The method of claim 1, wherein at least one of said photonic crystal defect waveguide and said photonic crystal defect cavity comprises an active material controlled by at least one of an electrical control signal and an optical control signal such that said coupling said optical signal between said first integrated circuit layer and said second integrated circuit layer includes at least one of modulating, amplifying, multiplexing, and demultiplexing the optical signal.

10. An integrated circuit device, comprising:
a first integrated circuit layer comprising an optical aperture;
a second integrated circuit layer comprising a photonic crystal defect waveguide and a photonic crystal defect cavity; and
an intervening layer positioned between the first intergrated circuit layer and the second intergrated circuit layer and having a lensing element positioned between the optical aperture and the photonic crystal defect cavity;
wherein an optical signal propagating along said photonic crystal defect waveguide is evanescently coupled between said photonic crystal defect waveguide and said photonic crystal defect cavity and projectably coupled between said photonic crystal defect cavity and said optical aperture and said lensing element configured to image said photonic crystal defect cavity and said optical aperture onto each other.

11. The integrated circuit device of claim 10, wherein said first and second integrated circuit layers are separated by a distance less than a lateral dimension of said photonic crystal defect cavity.

12. The integrated circuit device of claim 10, said photonic crystal defect waveguide being a first photonic crystal defect waveguide, said photonic crystal defect cavity being a first photonic crystal defect cavity, further comprising:
a second photonic crystal defect cavity in said second integrated circuit layer having a surface corresponding to said optical aperture; and
a second photonic crystal defect waveguide in the second integrated circuit layer, said optical signal being evanescently coupled between said second photonic crystal defect waveguide and said second photonic crystal defect cavity.

13. The integrated circuit device of claim 10, said optical aperture being a first optical aperture and said photonic crystal defect cavity being a first photonic crystal defect cavity, further comprising:
a second photonic crystal defect cavity in said first integrated circuit layer evanescently coupled with said photonic crystal defect waveguide for a frequency of said optical signal propagating therealong; and
a second optical aperture on the second integrated circuit layer projectably coupled with said second photonic crystal defect cavity at said frequency.

14. The integrated circuit device of claim 13, said photonic crystal defect waveguide being a first photonic crystal defect waveguide, said optical signal being a first optical signal, said frequency being a first frequency, further comprising:
a third optical aperture in said second integrated circuit layer projectably coupling a second optical signal with a third photonic crystal defect cavity in said first integrated circuit layer;
a second photonic crystal defect waveguide in said first integrated circuit layer evanescently coupled with said third photonic crystal defect cavity at a second frequency of said second optical signal;
a fourth photonic crystal defect cavity in said first integrated circuit layer evanescently coupled with said second photonic crystal waveguide at said second frequency; and
a fourth optical aperture in said second integrated circuit layer projectably coupled with said fourth photonic crystal defect cavity.

15. The integrated circuit device of claim 10, wherein at least one of said photonic crystal defect waveguide and photonic crystal defect cavity comprises an active material controlled by at least one of an electrical control signal and an optical control signal such that said optical signal is at least one of modulated, amplified, multiplexed, and demultiplexed when so evanescently or projectably coupled.

16. An apparatus, comprising:
a first integrated circuit layer comprising an optical aperture;
a second integrated circuit layer comprising a photonic crystal defect waveguide and a photonic crystal defect cavity;
means for evanescently coupling an optical signal propagating along said photonic crystal defect waveguide between said photonic crystal defect waveguide and said photonic crystal defect cavity; and
means for projectably coupling the optical signal between said photonic crystal defect cavity and said optical aperture.

17. The apparatus of claim 16, wherein said means for projectably coupling comprises a lensing element within an intervening layer positioned between said first integrated circuit layer and said second integrated circuit layer and configured to image said photonic crystal defect cavity and said optical aperture onto each other.

18. The apparatus of claim 16, wherein said means for projectably coupling is achieved by free-space radiation, the optical signal not passing through a lensing element between said photonic crystal defect cavity and said optical aperture.

19. The apparatus of claim 16, wherein said first and second integrated circuit layers are separated by a distance less than a lateral dimension of said photonic crystal defect cavity.

20. The apparatus of claim 16, said photonic crystal defect waveguide being a first photonic crystal defect waveguide, said photonic crystal defect cavity being a first photonic crystal defect cavity, further comprising:
a second photonic crystal defect cavity in said second integrated circuit layer having a surface corresponding to said optical aperture;
a second photonic crystal defect waveguide in said second integrated circuit layer; and
means for evanescently coupling said optical signal between said second photonic crystal defect waveguide and said second photonic crystal defect cavity.

21. The apparatus of claim 20, said optical aperture being a first optical aperture and said photonic crystal defect cavity being a first photonic crystal defect cavity, further comprising:
a second photonic crystal defect cavity in said first integrated circuit layer;
means for evanescently coupling said photonic crystal defect waveguide with said second photonic crystal defect cavity for a frequency of said optical signal;
a second optical aperture on the second integrated circuit layer; and
means for projectably coupling said second photonic crystal defect cavity with said second optical aperture.

22. The integrated circuit device of claim 16, wherein at least one of said means for evanescently coupling and means for projectably coupling comprises one of active means for modulating, active means for amplifying, active means for multiplexing, and active means for demultiplexing the optical signal.

* * * * *

UNITED STATES PATENT AND TRADEMARK OFFICE
CERTIFICATE OF CORRECTION

PATENT NO. : 7,570,849 B2
APPLICATION NO. : 11/158666
DATED : August 4, 2009
INVENTOR(S) : Sean M. Spillane et al.

It is certified that error appears in the above-identified patent and that said Letters Patent is hereby corrected as shown below:

In column 1, line 17, after "As" insert -- used herein, integrated circuit device refers broadly to a device having one or --.

In column 7, line 10, in Claim 4, delete "positioned" and insert -- located --, therefor.

In column 8, lines 18-19, in Claim 10, delete "intergrated" and insert -- integrated --, therefor.

In column 8, line 19, in Claim 10, delete "intergrated" and insert -- integrated --, therefor.

In column 9, line 31, in Claim 17, after "element" insert -- located --.

Signed and Sealed this

Twentieth Day of April, 2010

David J. Kappos
*Director of the United States Patent and Trademark Office*